US006680998B1

(12) United States Patent
Bell et al.

(10) Patent No.: US 6,680,998 B1
(45) Date of Patent: Jan. 20, 2004

(54) PROVIDING PRIVATE NETWORK INFORMATION DURING EMERGENCY CALLS

(75) Inventors: Robert T. Bell, Bountiful, UT (US); Rohit Dewan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/989,810

(22) Filed: Nov. 19, 2001

(51) Int. Cl.[7] .............................................. H04M 11/04
(52) U.S. Cl. .............................. 379/37; 379/41; 379/45
(58) Field of Search .............................. 379/37, 38, 39, 379/40, 41, 42, 43, 44, 45, 49; 455/404

(56) References Cited

U.S. PATENT DOCUMENTS

| | | | | |
|---|---|---|---|---|
| 5,805,670 A | * | 9/1998 | Pons ........................... | 379/45 |
| 5,940,474 A | * | 8/1999 | Ruus ........................... | 379/49 |
| 6,104,787 A | * | 8/2000 | Paris ....................... | 379/90.01 |
| 6,256,489 B1 | * | 7/2001 | Lichter et al. .............. | 455/404 |
| 6,307,920 B1 | | 10/2001 | Thomson et al. ............. | 379/45 |
| 6,411,700 B1 | | 6/2002 | Rojas .................... | 379/220.01 |
| 6,415,019 B1 | | 7/2002 | Savaglio et al. .............. | 379/45 |

OTHER PUBLICATIONS

Fernandez et al. ; System and Method . . . messaging to mobile phones; Dec. 16, 1999; WO 99/65256.*

* cited by examiner

*Primary Examiner*—Melur Ramakrishnaiah
(74) *Attorney, Agent, or Firm*—Baker Botts L.L.P.

(57) ABSTRACT

A telephony communication system includes a private network with multiple telephony devices that couples to the public switched telephone network (PSTN). During emergency calls from devices in the private network (such as 911 calls), elements of the private network may provide enhanced services. In response to an appropriate request during the emergency call, the private network may supply detailed location information of the calling device to the operator within the emergency call. The private network may further supply relevant personal information for a user associated with the calling device to the emergency operator during the call. The private network may supply the location information and/or personal information to other personnel, such as an emergency access point or private emergency response personnel. Private network may further conference private emergency response personnel into emergency calls between managed telephony devices and governmental emergency response personnel.

32 Claims, 3 Drawing Sheets

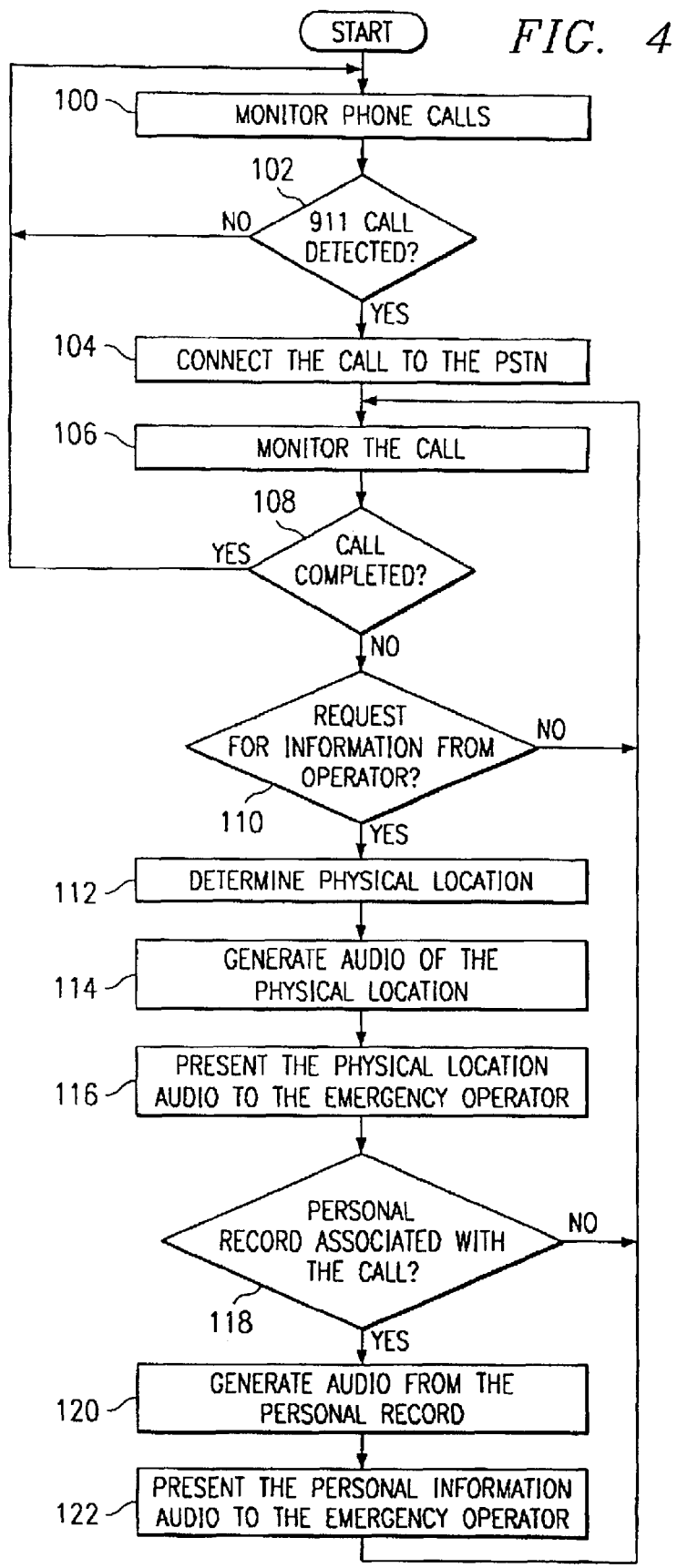

US 6,680,998 B1

PROVIDING PRIVATE NETWORK INFORMATION DURING EMERGENCY CALLS

TECHNICAL FIELD OF THE INVENTION

The present invention relates generally to emergency calls and, more particularly, to providing private network information during emergency calls.

BACKGROUND OF THE INVENTION

Enhanced 911 service (E911) has revolutionized the ability of emergency service providers to quickly respond to emergencies. As a part of E911 systems, operators receiving calls also receive information identifying the location from which the call was placed. This location information comes to the operator from a database within the public switched telephone network (PSTN) that maps telephone numbers to location information. However, this database may include incorrect or stale information or insufficient information to adequately locate the person placing the call. For example, in a privately managed network (such as a large corporate campus), the E911 operator may receive location information for a central point (such as a main lobby) that may not reflect the actual location of the caller.

SUMMARY OF THE INVENTION

In accordance with the present invention, techniques for providing private network information during emergency calls are provided which substantially eliminate or reduce disadvantages and problems associated with previous techniques. In a particular embodiment, the present invention satisfies a need for emergency operators to have access to relatively detailed location information for a device within a privately managed network.

According to one embodiment of the present invention, a method for providing location information during an emergency call detects an emergency call placed from a telephony device, determines a physical location of the telephony device, and receives a request for the physical location from an emergency operator handling the emergency call, with the request communicated by the emergency operator in the emergency call. In response to the request, the method generates audio identifying the physical location and presents the audio identifying the physical location to the emergency operator in the emergency call.

Embodiments of the invention provide various technical advantages. Using these techniques, a privately managed network may provide relatively detailed physical location information for a device placing an emergency call. For example, in response to an appropriate request from an emergency operator, an element in the private network may respond with physical location information for the device that placed the emergency call. Thus, while existing emergency systems may provide an emergency operator with a single location for a large private network, the private network may supplement this information by communicating far greater physical location detail to the emergency operator. Because this information is supplied by the private network, it is more likely that the information will be current and accurate in addition to being more precise than the information maintained within the PSTN.

In addition to providing precise physical location information, the private network may further provide additional information to an emergency operator to assist in obtaining an appropriate emergency response. According to particular embodiments, the private network maintains personal information associated with telephony devices within the private network. For example, the private network may maintain pertinent medical information for a user associated with a device. In response to an appropriate request from an emergency operator, the private network may supply this personal information to the emergency operator.

These techniques also permit a private network to provide location information to emergency operators without requiring alterations to existing public service answering points providing emergency services. However, these techniques anticipate an integration of information maintained within the PSTN and the functionalities provided by the private network. For example, the information stored within the PSTN that maps a central telephone number for the private network to location information for the private network may include some indication of a request that may be generated by an emergency operator to receive more detailed physical location information from the private network during an emergency call. For example, the location information stored by the PSTN may, in addition to an address for the private network, specify that an emergency operator may request more detailed location information by providing a signal, such as pressing the pound key.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 4 is a flowchart illustrating a method for providing location and personal information to an emergency operator during an emergency telephone call.

DETAILED DESCRIPTION OF THE DRAWINGS

Figure 1:
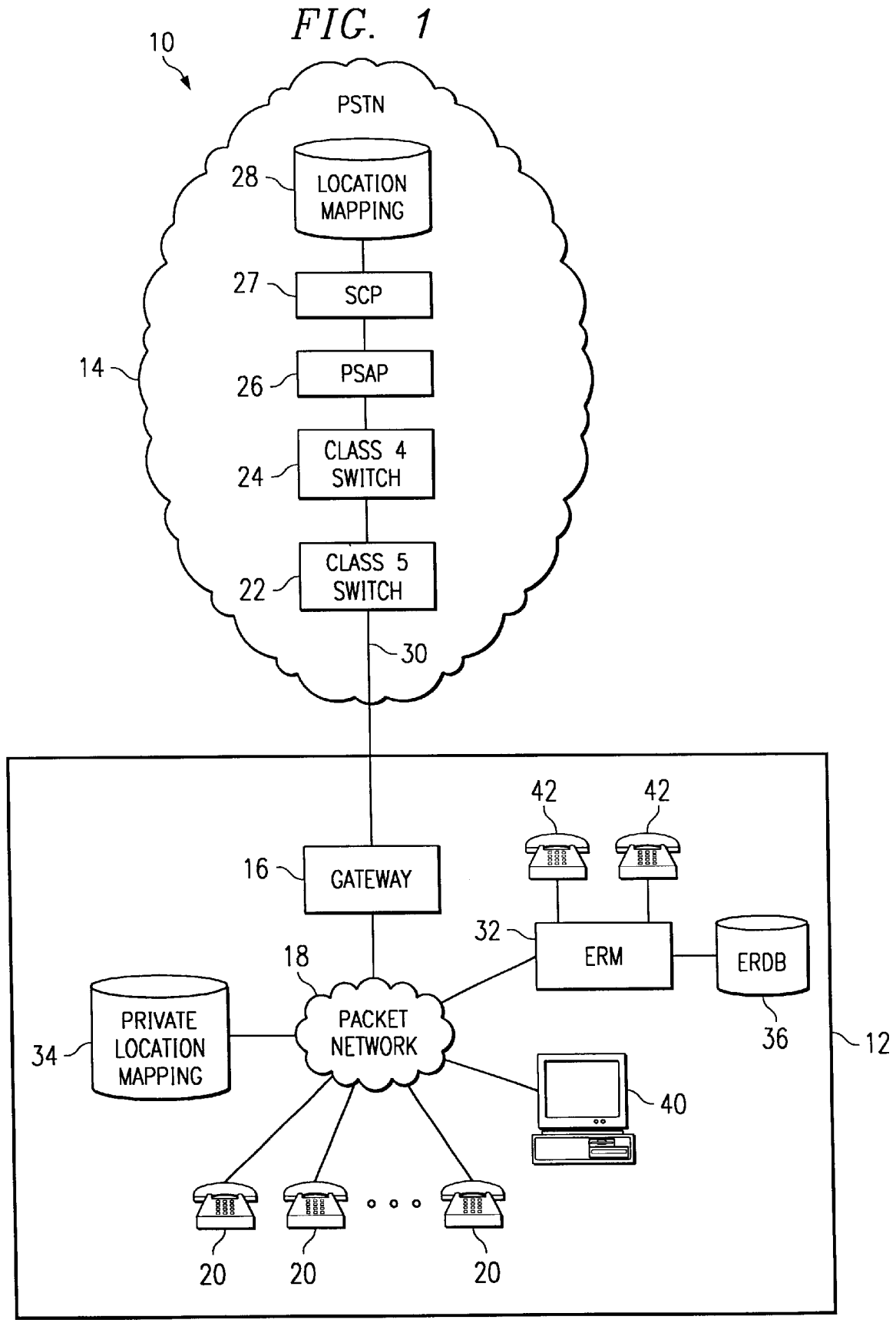
FIG. 1 illustrates a communication system that includes a public switched telephone network (PSTN) and a private network that provides enhanced services during emergency calls according to the present invention.

FIG. 1 illustrates a communication system, indicated generally at 10, that includes a private network 12 that couples to public switched telephone network (PSTN) 14 using a gateway 16. In addition to gateway 16, private network 12 also includes a packet network 18 and telephony devices 20. In general, private network 12 provides telephony communications for devices 20 and, using gateway 16, provides connectivity with PSTN 14. During an emergency call from one of devices 20, private network 12 may respond to an appropriate request from an emergency operator by communicating location information for device 20 within the emergency call.

PSTN 14 represents some portion of the public network that provides telephony services for various individuals and corporations. In the embodiment illustrated, PSTN 14 includes a class five local exchange carrier (LEC) switch 22, a class four E911 tandem switch 24, a public service answering point (PSAP) 26, a service control point (SCP) 27, and an automatic number identification (ANI) location mapping database 28. In general, switch 22 provides access to PSTN 14, for example, by connecting to gateway 16 using a trunk 30. Switch 24 provides routing control for telephone calls received by switch 22 and potentially provides access to long distance services of PSTN 14. Moreover, switch 24 provides access to the emergency 911 services provided by PSAP 26. For example, when switch 22 receives an emergency call on trunk 30, switch 24 routes the call to PSAP 26. In addition to routing the emergency call, switch 24 may provide information, such as an ANI entry for the device placing the emergency call, to PSAP 26. Thus, PSAP 26 may establish an emergency call with one or more of devices 20 through switches 22 and 24, while receiving information identifying the calling device 20 from switch 24.

Using the ANI received from switch 24, PSAP 26 requests location information from SCP 27. SCP 27 translates the request into an appropriate format, such as a transaction capabilities action part (TCAP) database query, and accesses mapping database 28 to determine the centrally maintained location information for the device placing the emergency call. However, as previously discussed, mapping database 28 may include incorrect or stale information or, in the case of private network 12, may indicate a single location for all of devices 20. Thus, the information within mapping database 28 may provide insufficient granularity to effectively route emergency personnel to an appropriate physical location.

According to particular embodiments, administrators and/or other entities associated with private network 12 may submit enhanced location information for inclusion within mapping database 28. For example, in addition to supplying location information identifying a central address for private network 12, an administrator may further include within the location information, instructions for an emergency operator handling an emergency call from private network 12 to request more detailed location information for device 20 placing the emergency call. For example, in addition to a central address for private network 12, the location information may include a line stating "for more detailed information press the pound button." Thus, the information presented to an emergency operator by PSAP 26 may instruct the operator on how to obtain detailed location information for device 20 from private network 12.

In the embodiment illustrated, private network 12 includes gateway 16, packet network 18, telephony devices 20, an emergency response module (ERM) 32, and a private location mapping database 34. In general, the elements of private network 12 provide communications services for users. Using gateway 16, private network 12 provides access for telephone calls to PSTN 14 from devices 20. For emergency calls placed from devices 20, gateway 16 provides a link to PSAP 26 within PSTN 14. Moreover, during an emergency call, gateway 16 may monitor the call and respond to an appropriate request from an emergency operator of PSAP 26 by communicating detailed location information of device 20 in the emergency call.

Gateway 16 represents any suitable collection and arrangement of hardware and associated logic for coupling private network 12 to PSTN 14 and for providing enhanced services during emergency calls. However, while the following description focuses on the operation of gateway 16 in providing enhanced services during an emergency call, system 10 contemplates private network 12 including any appropriate equipment and incorporating the enhanced emergency services within one or more elements having access to communications between devices 20 and PSAP 26. For example, private network 12 may incorporate some or all of the functionalities for providing enhanced emergency services within one or more other elements, such as ERM 32.

Packet network 18 represents any suitable collection and arrangement of hardware and associated logic providing transport of communications between various elements of private network 12. For example, private network 18 may represent a local area network (LAN) and/or wide area network (WAN) providing transportation of packets between elements, such as the transport of packets from devices 20 to gateway 16 during a communication session. Devices 20 represent communications equipment providing telephony services for various users. In the embodiment illustrated, devices 20 support packet based communications, such as voice over packet (VoP) communications. However, while the particular embodiment illustrated details services for packet based telephony devices, the concepts of this disclosure relating to enhanced emergency call services are applicable to any private communications network having access to emergency services of PSTN 14. Thus, similar techniques may be used in other types of communications networks, such as private branch exchanges (PBXs).

In operation, gateway 16 monitors telephone calls placed by devices 20. Upon detecting an emergency call from device 20 (for example, when a user dials 911), gateway 16 connects the call to PSTN 14 and the monitors the call. Upon detecting a request from an emergency operator handling the call, gateway 16 communicates detailed location information for device 20 to the emergency operator within the emergency call. The request from the operator may be in any appropriate form, such as dual-tone multi-frequency signals, Q.931 information messages, or other suitable responses. For example, the emergency operator may request detailed location information by pressing the pound button. In response, gateway 16 may generate an audio signal that details the location of device 20 in private network 12 and play this audio signal in the emergency call for receipt by the emergency operator. To prevent the operator from missing important information from the user while receiving the detailed location information, gateway 16 may overlay the location information on communications from the user placing the emergency call. Thus, while receiving the detailed location information, the emergency operator may continue to listen to and speak with the user.

To determine the location of device 20 placing an emergency call, gateway 16 may use any appropriate techniques. According to particular embodiments, gateway 16 accesses private location mapping database 34 to obtain a location record associated with device 20. This record may contain an audio recording of detailed location information for device 20, a text record of the detailed location information, and/or any other suitably formatted representation of the detailed location information. Depending upon the format used for maintaining this information in private location mapping database 34, gateway 16 performs suitable processing to generate an audio signal to play the detailed location information within an emergency call. For example, for a text record, gateway 16 may use speech synthesis technology to communicate the detailed location information to the emergency operator. However, while the embodiment illustrated details private network 12 maintaining location information in private location mapping database 34, system 10 contemplates private network 12 using any suitable techniques for determining and maintaining location information for devices 20. Thus, at the establishment of or during an emergency call, gateway 16 may use any suitable method for determining detailed location information for device 20 placing the emergency call.

System 10 contemplates private network 12 providing other services during emergency calls in addition to or in the alternative to providing detailed location information in response to an emergency operator request. One such service involves the transmission of detailed location information to an emergency access point, such that someone at the emergency access point may direct arriving emergency services personnel to the appropriate location. For example, as previously discussed, mapping database 28 in PSTN 14 may identify the location of an emergency access point within private network 12. By alerting someone at the emergency access point, such as a receptionist, to the existence of an emergency and the specific location of the emergency, responding emergency services personnel can more quickly be directed to the precise location that they are needed. For example, gateway 16 may supply detailed location information in a message to a computer 40 manned by a receptionist at the emergency access point.

Private network 12 may also provide for the conferencing of "private" emergency operators into an emergency call placed from device 20 to PSAP 26. For example, ERM 32 may be staffed by private emergency operators 42. When a user places an emergency call from device 20, gateway 16 may conference ERM 32 into the emergency call. Thus, private emergency operator 42 may listen to and/or interact with the user placing the call and the government emergency operator. The two emergency operators may then determine an appropriate emergency response. This may include a response from governmental emergency personnel, a response from private emergency personnel, or some combination of responses.

To determine available personnel and equipment within private network 12 for responding to an emergency, ERM 32 may access an emergency resources database 36. Emergency resources database 36 includes information on emergency resources, such as first aid equipment and personnel, for example, employees trained in cardiopulmonary resuscitation (CPR). For example, consider an emergency call placed from a user having a heart attack. ERM 32 may identify a CPR trained employee in close proximity to the "victim." ERM 32 may then contact this employee by automatically ringing an extension, thus providing a virtually instantaneous response in advance of the arrival of emergency services personnel.

In addition to maintaining and providing detailed location information for devices 20, private network 12 may also maintain personal information associated with users of private network 12 and associate users with particular devices 20. For example, private network 12 may maintain relevant medical information for its employees. During an emergency call, private network 12 may identify the employee associated with device 20, access the personal information for that employee, and provide this information to appropriate elements. For example, during the emergency call, gateway 16 may automatically, or in response to an appropriate request, communicate the information to PSAP 26. Similarly, gateway 16 may supply the personal information to ERM 32. Like the detailed location information, private network 12 may store the personal information using any suitable techniques and formats. For example, private network 12 may permit users to record voice messages and/or supply descriptions of relevant personal information.

Figure 2:
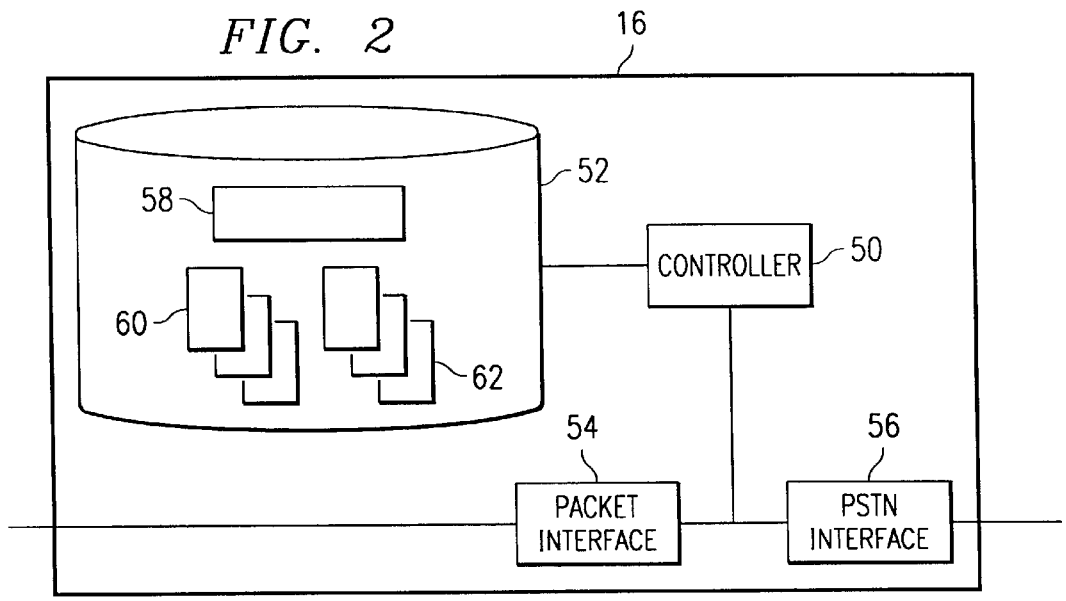
FIG. 2 is a block diagram illustrating exemplary functional components of a gateway within the private network for providing information during an emergency call.

FIG. 2 is a block diagram illustrating exemplary functional components of gateway 16 that includes a controller 50, a memory 52, a packet interface 54, and a PSTN interface 56. Gateway 16 couples to packet network 18 using packet interface 54 and couples to PSTN 14 using PSTN interface 56. Controller 50 executes code 58 maintained in memory 52 in order to control the operation of gateway 16. During an emergency call, controller 50 monitors the communications and, at appropriate times, accesses location records 60 and/or personal records 62 to provide enhanced emergency services.

Code 58 represents software, firmware, and/or other appropriate logic for use by elements of gateway 16 during operation. For example, code 58 may include software for execution by controller 50 to provide enhanced emergency services during emergency calls from devices 20. Location records 60 maintain detailed location information for some or all of devices 20 in private network 12. For example, location records 60 may include a text entry for each of devices 20 specifying precise physical location information within private network 12. Personal records 62 maintain relevant information about various users of private network 12. For example, personal records 62 may provide relevant medical information for one or more employees associated with devices 20. However, while shown in this embodiment as maintained within memory 52 of gateway 16, system 10 contemplates location records and personal records 62 residing in any suitable storage within private network 12, such as private location mapping database 34.

While the particular embodiment detailed includes specific functional elements, system 10 contemplates gateway 16 including any appropriate combination and arrangement of functional elements for performing its tasks. Thus, the functionalities performed by the particular elements illustrated may be separated or combined as appropriate and the functionalities of some or all of these elements may be implemented by logic encoded in media. Moreover, as previously discussed, some or all of the functionalities of gateway 16 may be distributed among elements within private network 12. For example, ERM 32 may provide enhanced emergency services by monitoring emergency calls placed by devices 20.

Figure 3:
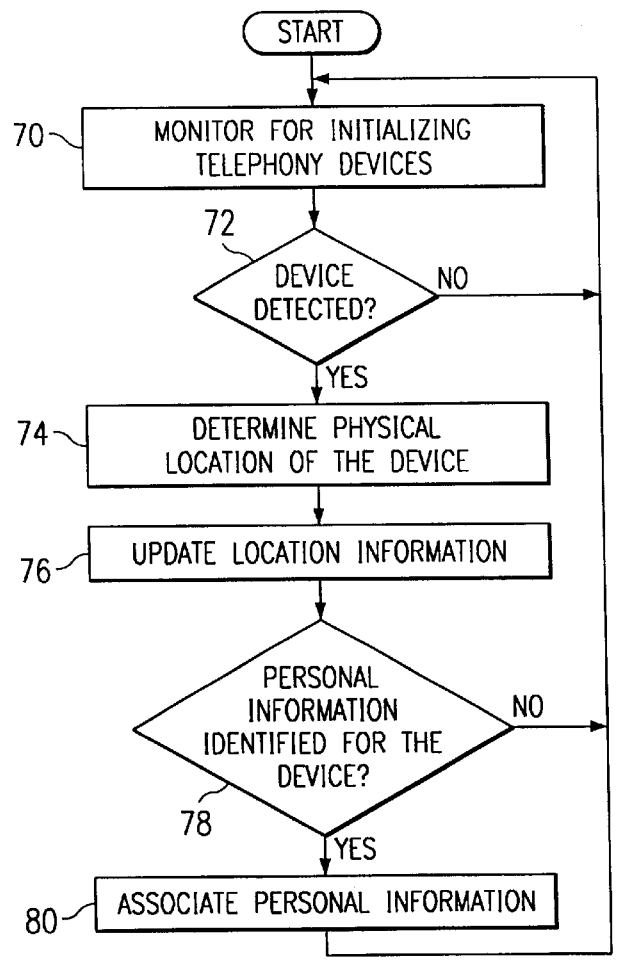
FIG. 3 is a flowchart illustrating a method for tracking location and personal information for telephony devices within the private network.

FIG. 3 is a flowchart illustrating a method for maintaining location information and personal information for devices 20 in private network 12. While the following description will focus on the operation of ERM 32, system 10 contemplates any appropriate elements performing these functions. ERM 32 monitors for initializing devices 20 at step 70. Upon detecting an initializing device 20 at step 72, ERM 32 determines a physical location of device 20 at step 74. This physical location may identify the position of device 20 using any appropriate granularity. Thus, the physical location may identify a general location for device 20 (such as a floor) all the way down to identifying a particular location (such as cube within a building). ERM 32 updates the location information for device 20 at step 76. For example, ERM 32 may generate location record 60 associated with device 20 and store this record within private location mapping database 34.

ERM 32 determines whether or not there is personal information associated with device 20 at step 78. For example, ERM 32 may determine whether a particular user has logged onto device 20 or is otherwise associated with device 20 and then determine whether there is personal information associated with this user. If so, ERM 32 associates this personal information, such as personal record 62, with device 20. However, while shown as occurring near to initialization of device 20, ERM 32 may support the association of location information and/or personal information with device 20 at any appropriate time.

Moreover, while the preceding flowchart illustrates a particular method for associating physical and personal information with device 20, system 10 contemplates appropriate elements of private network 12 using any suitable techniques for performing these tasks. Thus, ERM 32 may use techniques with additional steps, fewer steps, and/or different steps, with these steps performed in any appropriate order.

FIG. 4 is a flowchart illustrating a method for providing enhanced services during an emergency call. Gateway 16 monitors phone calls at step 100 and determines whether an emergency call has occurred at step 102. Upon detecting an emergency call, gateway 16 connects the call to PSTN 14 at step 104 and monitors the call at step 106. While monitoring the call, gateway 16 determines whether an appropriate request for information has been received from an emergency operator at step 110. Upon detecting such a request, gateway 16 determines the physical location of device 20 at step 112, generates an audio signal of this physical location at step 114, and presents the physical location audio to the emergency operator at step 116.

Gateway 16 determines whether device 20 has an associated personal record 62 at step 118. If so, gateway 20 generates audio from the personal record at step 120 and presents the personal information audio to the emergency operator within the emergency call at step 122. Thus, during an emergency call, gateway 16 may respond appropriate requests by providing detailed location information and/or relevant personal information to an emergency operator.

However, while the preceding flowchart illustrates a method having particular steps arranged in a specific order, system 10 contemplates gateway 16 and/or other appropriate elements using any suitable methods for providing enhanced emergency services. Thus, gateway 16 may use methods with additional steps, fewer steps, and/or different steps, so long as the techniques remain appropriate for providing enhanced services during emergency calls. Moreover, as previously discussed, enhanced services during emergency calls may further include gateway 16, ERM 32, and/or other appropriate elements providing additional services during emergency calls, such as providing location information to an emergency access point or conferencing private emergency operators into emergency calls placed between devices 20 and PSAP 26.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for providing location information during an emergency call, the method comprising the steps of:
    detecting an emergency call placed from a telephony device, the emergency call having an established voice link between the telephony device and an emergency operator communications device;
    determining a physical location of the telephony device;
    receiving a request for the physical location from an emergency operator handling the emergency call using the emergency operator communications device, the request communicated by the emergency operator in the emergency call; and
    in response to the request, generating audio identifying the physical location and presenting the audio identifying the physical location to the emergency operator in the emergency call.

2. The method of claim 1, wherein presenting the audio further comprises overlaying the audio identifying the physical location on communications from a user of the telephony device within the voice link.

3. The method of claim 1, wherein generating the audio comprises converting a text record of the physical location into speech.

4. The method of claim 1, further comprising:
    identifying a personal record associated with the telephony device;
    generating audio specifying information from the personal record; and
    presenting the audio specifying the information from the personal record to the emergency operator in the emergency call.

5. The method of claim 3, wherein the personal record comprises a medical history for a user associated with the telephony device.

6. The method of claim 3, wherein the personal record comprises a message prerecorded by a user associated with the telephony device.

7. The method of claim 1, wherein the emergency call couples the telephony device from within a private network to a public service answering point (PSAP) in the public switched telephone network (PSTN), the PSAP providing the emergency operator coarse physical location information for the telephony device, wherein the coarse physical location information identifies the request for soliciting the physical location from the private network and the request comprises a signal generated by the emergency operator using the emergency operator communications device, the physical location providing finer geographic granularity than the coarse physical location information.

8. The method of claim 1, wherein the response comprises a dual-tone multi-frequency signal.

9. The method of claim 1, further comprising:
    determining an emergency access point associated with the telephony device; and
    communicating an emergency notification to the emergency access point, the emergency notification identifying the physical location.

10. The method of claim 1, further comprising conferencing a private emergency operator in to the emergency call, such that the emergency operator, the private emergency operator, and a user of the telephony device may participate in the emergency call.

11. The method of claim 10, further comprising:
    accessing an emergency resources database based on a type of emergency for the emergency call and the physical location to determine available emergency resources; and
    presenting the available emergency resources to the private emergency operator.

12. A network apparatus comprising:
    a database maintaining location information, the location information identifying a physical location of a telephony device;
    an interface operable to detect an emergency call placed from the telephony device, the emergency call having an established voice link between the telephony device and an emergency operator communications device, the interface further operable to receive a request for the physical location from an emergency operator handling the emergency call, the request communicated by the emergency operator in the emergency call, and to insert audio signals into the voice link of the emergency call; and a controller operable, in response to the request, to access the location information to determine the physical location, to generate audio identifying the physical location, and to present the audio identifying the physical location to the emergency operator in the emergency call using the interface.

13. The apparatus of claim 12, wherein the controller is further operable to present the audio by overlaying the audio identifying the physical location on communications from a user of the telephony device using the interface within the voice link.

14. The apparatus of claim 12, wherein:
the database maintains the physical location in text; and
the controller is further operable to generate the audio by converting the text of the physical location into speech.

15. The apparatus of claim 12, wherein:
the database further maintains a personal record associated with the telephony device; and
the controller is further operable to generate audio specifying information from the personal record and to present the audio specifying the information from the personal record to the emergency operator in the emergency call using the interface.

16. The apparatus of claim 15, wherein the personal record comprises a medical history for a user associated with the telephony device.

17. The apparatus of claim 15, wherein the personal record comprises a message prerecorded by a user associated with the telephony device.

18. The apparatus of claim 12, wherein the emergency call couples the telephony device from within a private network to a public service answering point (PSAP) in the public switched telephone network (PSTN), the PSAP providing the emergency operator coarse physical location information for the telephony device, wherein the coarse physical location information identifies the request for soliciting the physical location from the private network and the request comprises a signal generated by the emergency operator using the emergency operator communications device, the physical location providing finer geographic granularity than the coarse physical location information.

19. The apparatus of claim 12, wherein the response comprises a dual-tone multi-frequency signal.

20. The apparatus of claim 12, wherein the telephony device comprises a packet-based telephony communications apparatus coupled to a private packet-based network.

21. The apparatus of claim 12, wherein the controller is further operable to:
determine an emergency access point associated with the telephony device; and
communicate an emergency notification to the emergency access point, the emergency notification identifying the physical location.

22. The apparatus of claim 12, wherein the controller is further operable to conference a private emergency operator in to the emergency call, such that the emergency operator, the private emergency operator, and a user of the telephony device may participate in the emergency call.

23. The apparatus of claim 22, wherein the controller is further operable to:
access an emergency resources database based on a type of emergency for the emergency call and the physical location to determine available emergency resources; and
present the available emergency resources to the private emergency operator.

24. Logic for providing location information during an emergency call, the logic encoded in media and operable to:
detect an emergency call placed from a telephony device, the emergency call having an established voice link between the telephony device and an emergency operator communications device;
determine a physical location of the telephony device;
receive a request for the physical location from an emergency operator handling the emergency call, the request communicated by the emergency operator in the emergency call; and
in response to the request, generate audio identifying the physical location and presenting the audio identifying the physical location to the emergency operator in the emergency call.

25. The logic of claim 24, further operable to present the audio further by overlaying the audio identifying the physical location on communications from a user of the telephony device within the voice link.

26. The logic of claim 24, further operable to:
identify a personal record associated with the telephony device;
generate audio specifying information from the personal record; and
present the audio specifying the information from the personal record to the emergency operator in the emergency call.

27. The logic of claim 24, wherein the emergency call couples the telephony device from within a private network to a public service answering point (PSAP) in the public switched telephone network (PSTN), the PSAP providing the emergency operator coarse physical location information for the telephony device, wherein the coarse physical location information identifies the request for soliciting the physical location from the private network, the physical location providing finer geographic granularity than the coarse physical location information.

28. The logic of claim 24, further operable to:
determine an emergency access point associated with the telephony device; and
communicate an emergency notification to the emergency access point, the emergency notification identifying the physical location.

29. The logic of claim 24, further comprising conferencing a private emergency operator in to the emergency call, such that the emergency operator, the private emergency operator, and a user of the telephony device may participate in the emergency call.

30. The logic of claim 29, further comprising:
accessing an emergency resources database based on a type of emergency for the emergency call and the physical location to determine available emergency resources; and
presenting the available emergency resources to the private emergency operator.

31. A network apparatus with a private network, the apparatus comprising:

means for detecting an emergency call placed from a telephony device, the emergency call having an established voice link between the telephony device and an emergency operator communications device;

means for determining a physical location of the telephony device;

means for receiving a request for the physical location from an emergency operator handling the emergency call, the request communicated by the emergency operator in the emergency call; and means for, in response to the request, generating audio identifying the physical location and presenting the audio identifying the physical location to the emergency operator in the emergency call.

32. A method for providing location information during an emergency call, the method comprising the steps of:

detecting an emergency call placed from a telephony device, the emergency call coupling the telephony device from within a private network to a public service answering point (PSAP) in the public switched telephone network (PSTN), the PSAP providing an emergency operator coarse-grained physical location information for the telephony device;

determining a fine-grained physical location of the telephony device;

receiving a request for the fine-grained physical location from the emergency operator, the request communicated by the emergency operator in the emergency call; and in response to the request, generating audio identifying the fine-grained physical location and presenting the audio identifying the fine-grained physical location to the emergency operator in the emergency call, wherein presenting the audio comprises overlaying the audio identifying the physical location on communications from a user of the telephony device.

\* \* \* \* \*